United States Patent [19]
Bollinger et al.

[11] 3,907,587
[45] Sept. 23, 1975

[54] METHOD AND APPARATUS FOR REMOVING BROKEN-OFF CHIPS FROM A SHEET STACKING STATION

[75] Inventors: Dwight A. Bollinger, Hadley; William P. Cathers, Allison Park, both of Pa.

[73] Assignee: PPG Industries, Inc., Pittsburgh, Pa.

[22] Filed: Dec. 13, 1973

[21] Appl. No.: 424,586

[52] U.S. Cl. ................... 134/32; 15/306 B; 134/37; 214/6 D; 214/152
[51] Int. Cl.² ...................... B08B 5/00; B65G 57/00
[58] Field of Search .................. 134/37, 32, 15, 21; 15/303, 306 R, 306 B, 316 R, 316.4; 65/27, 168; 214/6 D, 6 DS, 152; 271/211

[56] References Cited
UNITED STATES PATENTS

| | | |
|---|---|---|
| 2,882,048 | 4/1959 | Smith .................................. 271/211 |
| 3,104,187 | 9/1963 | Jenkins et al. ..................... 134/37 X |
| 3,601,837 | 8/1971 | Conrad et al. ................. 15/316 R X |
| 3,675,788 | 7/1972 | Cathers ........................ 214/6 DS X |
| 3,805,317 | 4/1974 | Dickinson ..................... 15/316 R X |

*Primary Examiner*—S. Leon Bashore
*Assistant Examiner*—Richard V. Fisher
*Attorney, Agent, or Firm*—Donald Carl Lepiane

[57] ABSTRACT

In stacking sheet material, e.g. glass sheets, successive individual sheets are transferred by conveying facilities from a first position toward a release point along the conveyor path. A sheet is released from the conveying facilities at the release point and moves along a trajectory path toward a lead edge stop device positioned at the stacking station. As the leading edge of the sheet engages the stop device, flares at the leading edge of the glass break away as glass chips and are projected over the uppermost surface of the sheet.

10 Claims, 4 Drawing Figures

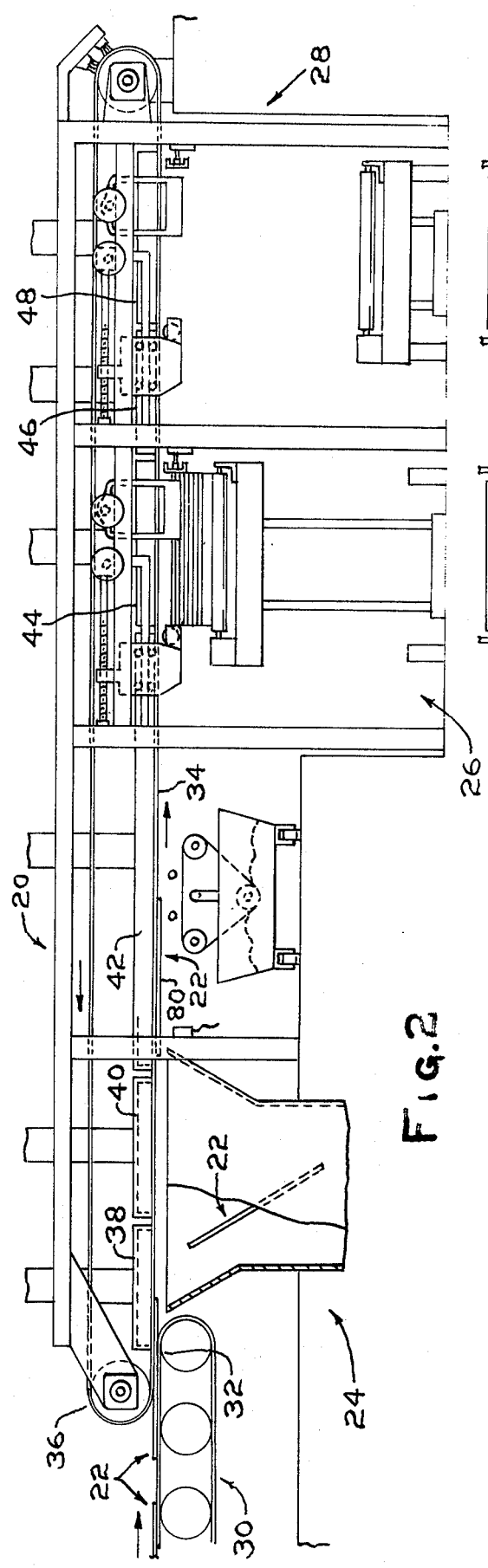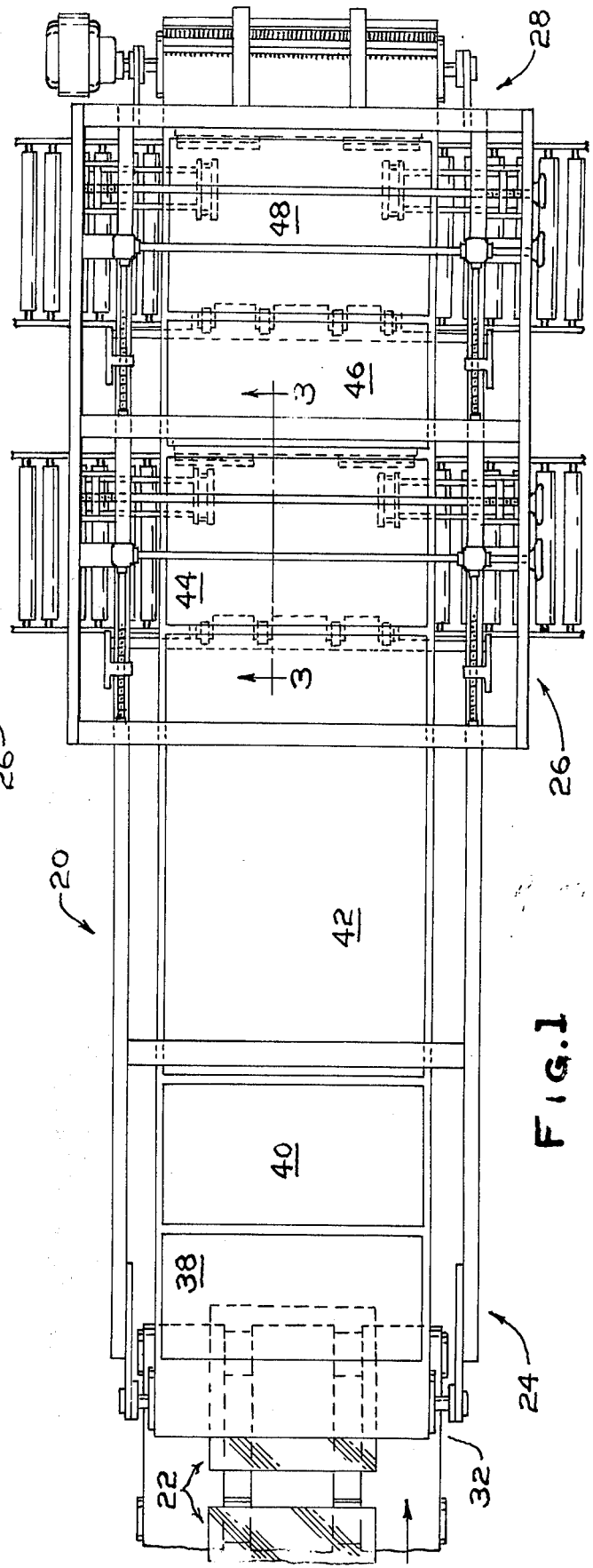

METHOD AND APPARATUS FOR REMOVING BROKEN-OFF CHIPS FROM A SHEET STACKING STATION

This invention relates to a method of and device for removing the glass chips from the uppermost surface to prevent the glass chips from becoming trapped between stacked sheets and damaging the surface of the sheets.

RELATED APPLICATIONS

The lead edge stop device disclosed in U.S. patent application Ser. No. 424,592 filed Dec. 13, 1973, in the name of William P. Cathers and entitled "Lead Edge Stop Device" may be used with this invention. The stacking apparatus disclosed in U.S. patent application Ser. No. 424,507 filed Dec. 13, 1973, in the name of Dwight A. Bollinger, William P. Cathers, and Harry S. Koontz and entitled "Apparatus for Stacking Sheet Material" may use the chip blow off device for the invention. Disclosures of the above-mentioned are hereby incorporated by reference.

BACKGROUND OF THE INVENTION

1. Field of the Invention

The present invention relates to a method of and device for removing chips of glass from a stacking station.

2. Description of the Prior Art

A ribbon of glass is normally cut into sheets and the individual sheets are subsequently stacked for shipment or storage. At the present time, there are available apparatuses for transferring individual sheets from a first position to a second position where the individual sheets are arranged in a stack. One such transferring stacking apparatus is disclosed in U.S. Pat. No. 3,480,160.

In general, the apparatus of the above-mentioned patent discloses a conveyor for transferring sheets from a first position, e.g. a load position, toward a stacking station. As the sheet approaches the stacking station, the sheet is released from the belt and moves along a trajectory path toward the stacking station where facilities are provided for arresting the motion of the sheet and aligning individual sheets in a stack.

Several expediencies are disclosed in the above-mentioned patent for aligning the individual sheets in the stack. For example, the leading edge and trailing edge of the sheet are aligned with the stack by providing a lead edge stop and trail edge stop. In general, the leading edge of the sheet engages the lead edge stop and the sheet rebounds therefrom toward the trail edge stop. The sheet then rebounds from the trail edge stop toward the lead edge stop, as the sheet drops onto the stack.

As the leading edge of the sheet and trailing edge of the sheet engage the lead edge stop and trail edge stop respectively, flares at the edges of the sheet break away as chips of glass. The chips of glass are projected over and onto the uppermost surface of the falling sheet. When the sheets are stacked with chips of glass between surfaces of adjacent sheets, the surfaces are marred and unuseable.

SUMMARY OF THE INVENTION

This invention relates to an improvement in the method of stacking sheets, e.g. glass sheets. In general, the prior art method of stacking sheets includes moving a sheet along a trajectory path toward a receiving surface and engaging the sheet as it moves along the trajectory path to align the sheet. Flares at the cut edges of the sheet break away as chips and are projected over the uppermost surface of the sheet. The improvement includes removing the chips from the uppermost surface while the chips are airborne.

The invention also relates to a device for carrying out the method of the invention.

BRIEF DESCRIPTION OF THE INVENTION

FIG. 1 is a plan view of a stacking apparatus having portions removed for purposes of clarity that may use the instant invention;

FIG. 2 is a side view of the apparatus of FIG. 1;

DETAILED DESCRIPTION OF THE INVENTION

Figure 3:
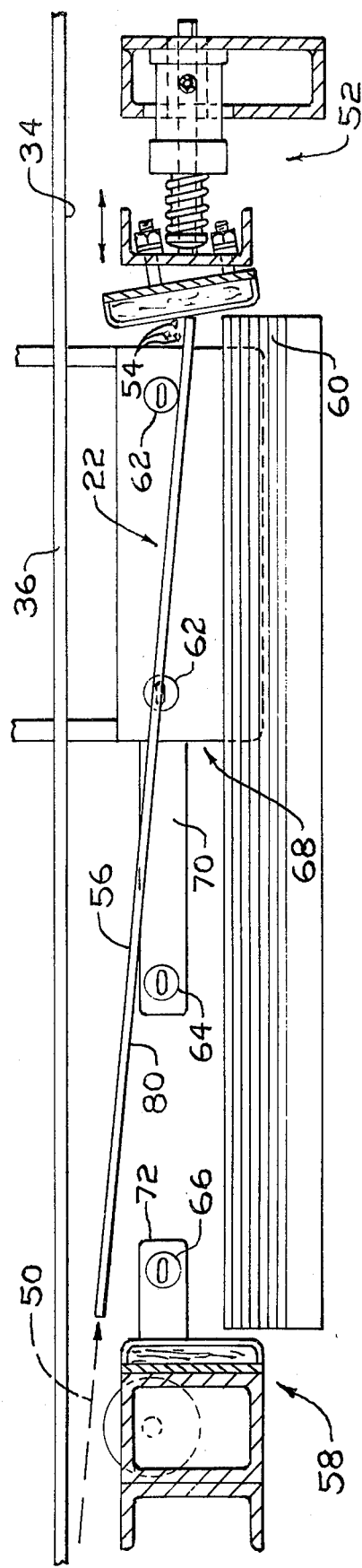
FIG. 3 is a view taken along line 3—3 of FIG. 1 illustrating one embodiment of the invention for removing chips from a stacking station.

In general, this invention relates to a method of and device for removing chips of glass that break away from the leading edge and trailing edge of sheets to be stacked. Sheets of glass cut from glass ribbons are moved along a conveyor toward a load position. Occasionally, the cut edges of the glass sheet has flares which protrude from the cut edges of the glass. Flares at the cut edges of the sheet are usually present when (1) the cutting of the sheet is poor due to worn cutting wheels and (2) the snappers are not properly aligned.

At the loading position, the sheets of glass are engaged by a conveyor belt and move toward a stacking station. At the stacking station, the sheets of glass are successively released from the conveyor and move along a trajectory path toward a lead edge stop device. The lead edge stop device absorbs the force of the sheet and urges the sheet toward a trail edge stop device. As the leading edge of the glass and the trailing edge of the glass engage the lead edge stop and trail edge stop devices respectively, the flares at the cut edges of the sheets break away as glass chips and are projected over the uppermost surface of the falling sheet. A fluid is moved across the uppermost surface of the falling sheet to move the chips of glass away from the falling sheet.

For purposes of illustration, the method and device of this invention will be discussed in conjunction with the stacking apparatus disclosed in the above-mentioned U.S. patent application Ser. No. 424,507 filed Dec. 13, 1973, in the names of D. A. Bollinger, W. P. Cathers and H. S. Koontz and with the lead edge stop device disclosed in U.S. patent application Ser. No. 424,592 filed Dec. 13, 1973 in the name of William P. Cathers. The disclosure of both of the above-identified applications are hereby incorporated by reference. However, as will be appreciated, the method and device of this invention may be used with any prior art stacking apparatuses and lead edge stop devices. Further, as will be appreciated, the invention is not limited to glass sheets but can be used with any rigid sheets having breakable flares or equivalence thereof such as plastic or metal sheets.

With reference to FIGS. 1 and 2, there is shown the stacking apparatus of the above-identified application designated by the numeral 20. Sheets of glass 22 cut from a glass ribbon (not shown) are programmed for one of a plurality of stations, e.g. a cullet bin 24, a first stacking station 26, or a second stacking station 28.

The sheets of glass 22 are moved along a horizontal conveyor 30 to a load position 32 where the sheets move into engagement with the lower reach 34 of a perforated endless conveyor belt 36. Vacuum is applied by vacuum chamber 38 to maintain the sheet against the lower reach of the belt at the loading station. The sheet is held against the belt by vacuum from vacuum chambers 40, 42, 44, 46, and 48 and moved away from the load position 32 toward the stations. Sheets programmed for the cullet bin are released from the lower reach of the belt by shutting off a vacuum to the vacuum chamber 40 and sheets programmed for the first or second stacking station are released from the lower reach of the belt by shutting off vacuum to vacuum chambers 44 or 48 respectively, in the manner disclosed in the above-identified application Ser. No. 424,507 filed Dec. 13, 1973, in the names of D. A. Bollinger, W. P. Cathers and H. S. Koontz.

With reference to FIG. 3, as a sheet 22 is released from the lower reach 34 of the belt 36 at a stacking station, e.g. the first stacking station 26, the sheet moves along the trajectory path 50 toward a lead edge stop device 52 such as the type disclosed in the above-mentioned U.S. patent application Ser. No. 424,592 filed Dec. 13, 1973, in the name of W. P. Cathers. As the leading edge of the sheet engages the lead edge stop device 52, the flares at the leading edge of the glass can break away as chips of glass 54 and are projected over the uppermost surface 56 of the falling sheet. The sheet rebounds from the lead edge stop device 52 and is moved toward a trail edge stop device 58. As the trailing edge of the sheet moves into engagement, flares at the trailing edge can break away as chips of glass (not shown) and are similarly projected over the uppermost surface 56 of the falling sheet of glass.

While the chips of glass at the leading edge and trailing edge are still airborne, a fluid, e.g. air, is moved under pressure across the uppermost surface 56 of the falling sheet of glass to move the chips of glass from the uppermost surface 56. In the following discussion, one expediency will be discussed for providing the fluid to blow the chips of glass across the uppermost surface of the sheet. However, as will be appreciated, the invention is not limited thereto.

Figure 4:
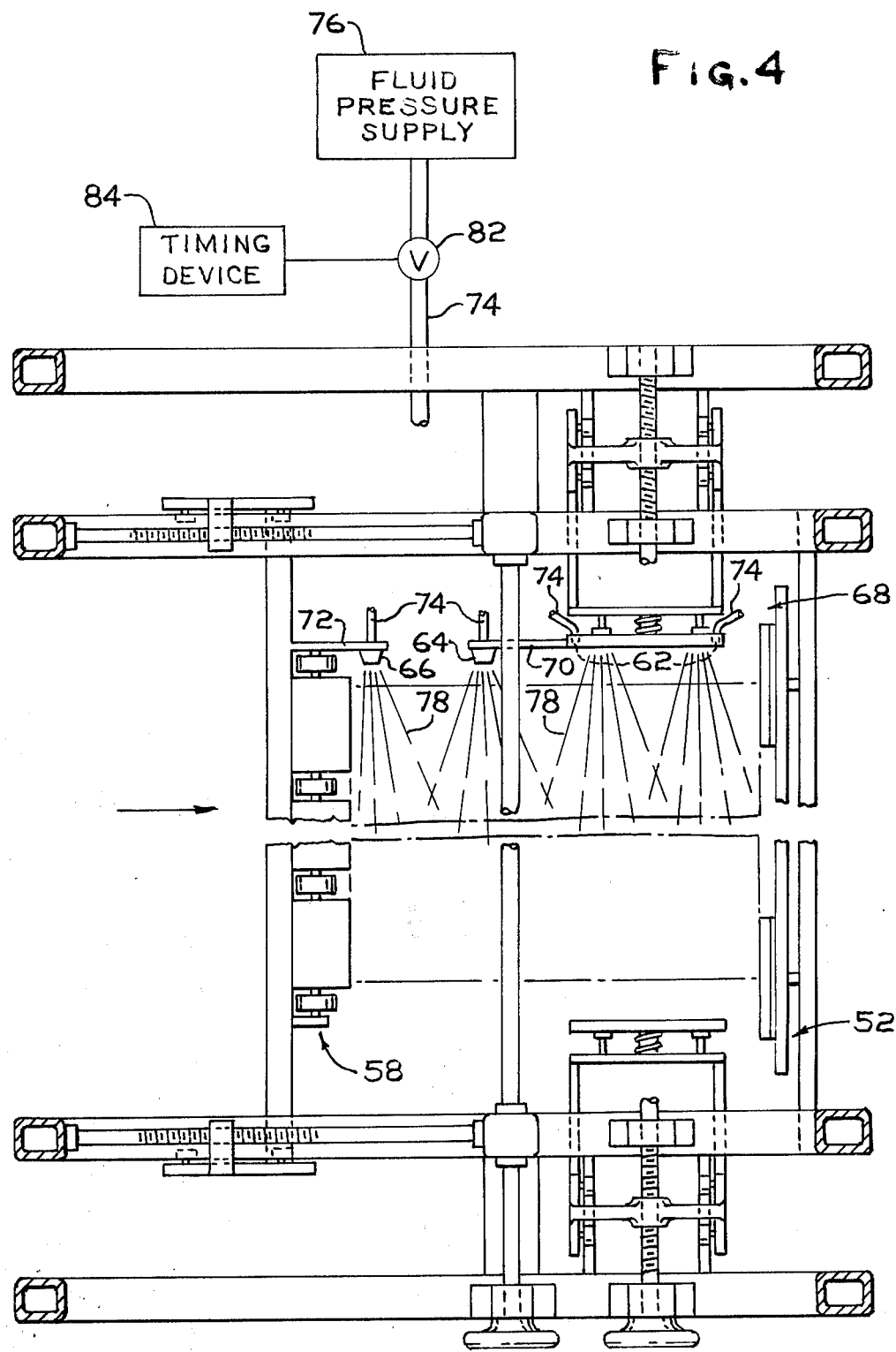
FIG. 4 is a plan view of a stacking station of the apparatus shown in FIGS. 1 and 2 having portions removed to show streams of fluid removing chips from the stacking station.

With reference to FIGS. 3 and 4, mounted adjacent one side of a stack 60 of sheets 22 are a plurality of nozzles 62, 64, and 66. The nozzles 62 are mounted in a side alignment member 68 such as the type disclosed in U.S. patent application Ser. No. 424,507 filed Dec. 13, 1973, in the names of D. A. Bollinger, W. P. Cathers and H. S. Koontz. The nozzle 64 is detachably secured for adjustment to a member 70 extending away from side alignment member 68 as shown in FIG. 3. The nozzle 66 is detachably secured for adjustment to member 72 extending away from the trail edge device 58 as shown in FIG. 3. The nozzles 64 and 66 are adjustable to accommodate various sheet lengths.

The nozzles 62, 64, and 66 are connected by a conduit 74 to a fluid pressure supply 76 (shown in FIG. 4). The nozzles direct streams of air 78 over the uppermost surface 56 of the sheet from one side to the opposite side when the leading edge engages the lead edge stop device 52 and the trailing edge of the glass engages the trail edge stop device 58. The streams of air 78 blow the chips of glass from the uppermost surface 56 while the chips of glass are airborne. It has been found that if the chips of glass fall on the surface they are difficult if not impossible to remove.

In certain instances, interleaver materials are provided on bottom surface 80 of the glass sheet. In those instances, it is recommended that: (1) the nozzles be spaced relative to the falling sheet so the streams of air are directed over the uppermost surface so as not to disturb the interleaver material on the bottom surface; (2) the stream of air be sufficiently close to the uppermost surface so as to remove the chips of glass while they are airborne; and (3) the nozzles be controlled so as to blow the stream of air across the uppermost surface as the leading edge engages the lead edge stop. In those instances when the sheet does not have interleaver material it is only recommended that the streams of air be sufficiently close to the uppermost surface so as to remove the chips of glass while they are airborne.

A monitoring system may be used to release individual sheets from the lower reach of the belt and move the sheets along the same trajectory path of all the sheets into engagement with the lead edge stop device. In this manner, the nozzles may be spaced above the trajectory path and controlled by a solenoid 82 mounted in the conduit 74 (see FIG. 4). The solenoid 82 is normally in the closed position and is opened in any conventional manner as by a timing device 84 so as to direct the streams of air across the uppermost surface as the leading edge engages the lead edge stop device. Such a timing system and monitoring system are disclosed in the above-mentioned U.S. patent application Ser. No. 424,507 filed Dec. 13, 1973, in the names of D. A. Bollinger, W. P. Cathers and H. S. Koontz.

As can be appreciated, the invention is not limited to the number of nozzles. For example, a slot nozzle may extend from the leading edge stop device 52 to the trail edge stop device 58, or a plurality of nozzles may be used. However, if a plurality of nozzles are used, it is recommended that the streams overlap as shown in FIG. 4 so that all the chips of glass are removed.

With reference to FIG. 4, the discussion will be directed to using a plurality of nozzles to remove the chips of glass from the uppermost surface of the falling sheet. For sheets having a width of up to 35 inches, i.e. the distance between the leading edge and trailing edge of the sheet, the nozzles 62 and 64 should be spaced about 9 inches apart starting about 2 ½ inches from the lead edge stop device 52. The nozzle 66 should be spaced about 2 ½ inches from the trail edge stop device 58. It is recommended that the nozzles have a rectangular shape, e.g. having a dimension of 3/16 × ⅞ inch, so that the streams of fluid eminating from the nozzles overlap as shown in FIG. 4.

As the length of the sheet increases, the fluid pressure should increase. Pressures of 80 psi have been found to be satisfactory in removing chips across the sheet having a length of 80 inches. For sheets having a length greater than 80 inches the pressure should be increased to greater than 80 psi.

We claim:
1. In a method of stacking a sheet on a receiving surface, the sheet having a leading edge and a trailing edge with break away protrusions at least at the leading edge, including the steps of moving the sheet along a trajectory path over the receiving surface; and engag- ing the leading edge of the sheet as it moves along the trajectory path to align the sheet on the receiving surface wherein the protrusions at the leading edge break away from the leading edge as chips when the leading edge is engaged and a number of the chips are projected over uppermost surface of the sheet, wherein the improvement comprises the step of:

removing the chips projected over the uppermost surface of the sheet (1) while the chips are airborne and (2) in a direction away from the receiving surface and the trajectory path.

2. The improved method as set forth in claim 1 wherein said removal step is accomplished by:

directing at least one pressurized stream of fluid (1) in a direction transverse to the trajectory path and (2) over the uppermost surface of the sheet.

3. The improved method as set forth in claim 2 wherein the fluid is air.

4. The improved method as set forth in claim 1 wherein the trailing edge of the sheet has break away protrusions and the leading edge of the sheet engages a lead edge stop device and rebounds therefrom to move the trailing edge of the sheet into engagement with a trail edge stop device wherein the protrusions at the trailing edge break away from the trailing edge as chips when the trailing edge engages the trail edge stop device and a portion of the chips are projected over the uppermost surface of the sheet, including the step of:

removing the chips projected over the uppermost surface of the sheet (1) while the chips are airborne and (2) in a direction away from the receiving surface and the trajectory path.

5. The improved method as set forth in claim 4 wherein said removing step is accomplished by:

directing at least one pressurized stream of fluid (1) in a direction transverse to the trajectory path and (2) over the uppermost surface of the sheet.

6. The improved method as set forth in claim 5 wherein the fluid is air.

7. The improved method as set forth in claim 1 wherein the sheet is a glass sheet and the chips are chips of glass.

8. In an apparatus for removing chips from sheets with break away protrusions on at least the leading edge falling from an upper level along a descending trajectory to form a stack of said sheets on a receiving surface at the lower end of said trajectory, said sheets each having a leading edge and a trailing edge, the improvement which comprises:

a leading edge stop means positioned adjacent said receiving surface and at a location below the level from which the sheets fall to form said stack of sheets on said receiving surface, and wherein the protrusions of at least the leading edge break away as chips when the leading edge engages the leading edge stop means, and at least one fluid supply means positioned so as to be directed toward an edge of each falling sheet extending between the leading and trailing edges thereof and across a major surface of each sheet, said fluid supply means being positioned at a level between said receiving surface and the level from which said sheets fall and at a location above that of the top sheet of the stack of sheets formed, whereby a fluid medium directed by said fluid supply means across a major surface of each of said falling sheets moves said chips while the chips are air borne in a direction away from the descending trajectory through which the sheets fall and the receiving surface upon which said sheets are stacked.

9. The apparatus of claim 8, having a trailing edge stop means disposed rearwardly of said leading edge stop means, which trailing edge stop means is positioned adjacent said receiving surface and at a location below the level from which the sheets fall to form said stack of sheets on said receiving surface, and wherein the trailing edge of the sheet has break away protrusions which break away as chips when the trailing edge engages the trailing edge stop means.

10. The apparatus of claim 8, having a plurality of spaced fluid supply means, each being positioned at a level between said receiving surface and the level from which said sheets fall and at a location above that of the top sheet of the stack of sheets formed.

* * * * *